INVENTOR.
HAROLD L. GILBERT
BY William Cleland
Attorney

UnitedStates Patent Office 3,204,900
Patented Sept. 7, 1965

3,204,900
SUPPORTING HANGER FOR GLASS CONDUIT
Harold L. Gilbert, Akron, Ohio
(513 Evergreen Drive, Tallmadge, Ohio)
Filed Sept. 26, 1963, Ser. No. 311,740
4 Claims. (Cl. 248—56)

This invention relates to a hanger for supporting conduit, and in particular relates to a hanger for supporting heat- and chemical-resistant glass conduit of the type used in chemical laboratories and the like.

Heretofore, heat-resistant glass conduit, of the class described has been supported in vertical condition by means of sectional metal supporting hangers, which are gripped directly about the conduit. Metal clamps, however, score or scratch the glass conduit and sometimes cause the same to break, with damaging results. Metal-to-glass contact between the hanger and the conduit, moreover, does not provide a sufficiently strong grip to prevent slippage of the conduit with respect to the hanger.

One object of the invention is to provide a hanger of the characted described which will strongly embrace and supportingly grip glass conduit without scratching the same, whereby breakage of the conduit is reduced to a minimum.

Another object of the invention is to provide a supporting hanger of the character described which is yieldingly adjustable about vertically extending, heavy glass conduit to provide strong, non-slip gripping support for the same.

Other objects of the present invention will be manifest from the following brief description and the accompanying drawings.

Figure 1:
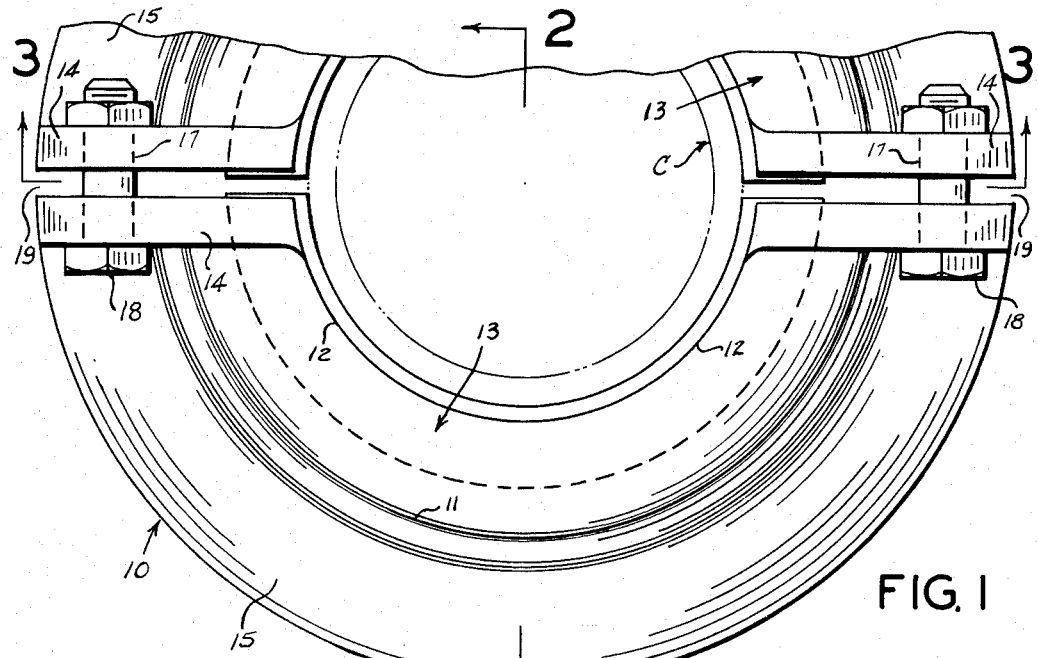
FIGURE 1 is a top plan view of a hanger embodying the features of the invention, supportingly clamped to a glass conduit which is shown in chain-dotted lines, and the hanger being in vertical supporting engagement with a floor.
Figure 2:
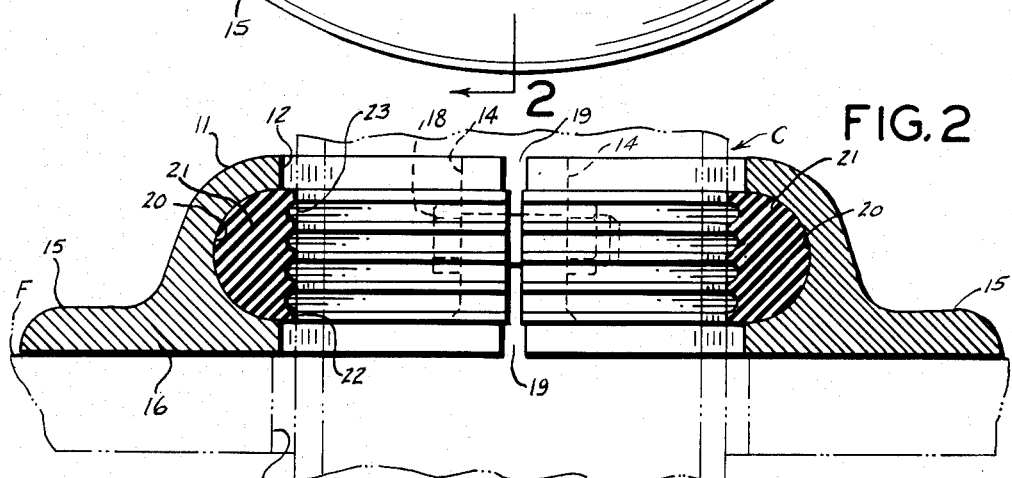
FIGURE 2 is a vertical cross-section taken substantially on the line 2—2 of FIGURE 1, the conduit and the supporting floor being indicated in chain-dotted lines.

Referring to the drawings generally, the numeral 10 designates a segmental conduit-supporting hanger including a two-part annular collar 11 of metal, rigid plastic, or other hard, durable material. The collar 11 may have a cylindrical central opening 12 therethrough of larger diameter than the Pyrex or other heat-resistant glass conduit C to be supported, and is formed in two like semi-circular segments 13, 13 each having integral out-turned lugs 14, 14 at the opposite ends thereof, and an out-turned arcuate flange 15 integrally connecting the collar and the end lugs to provide a flat underside 16 for flatwise supporting engagement with a floor or like structure F, as shown in FIGURES 1 and 2. The peripherally adjacent lugs 14 of the assembled segments 13 have aligned apertures 17, 17 for reception of clamping bolts 18, 18, normally retaining the segments together as a unit, to have spaces 19, 19 between the lugs which allow for clamping adjustments.

Figure 3:
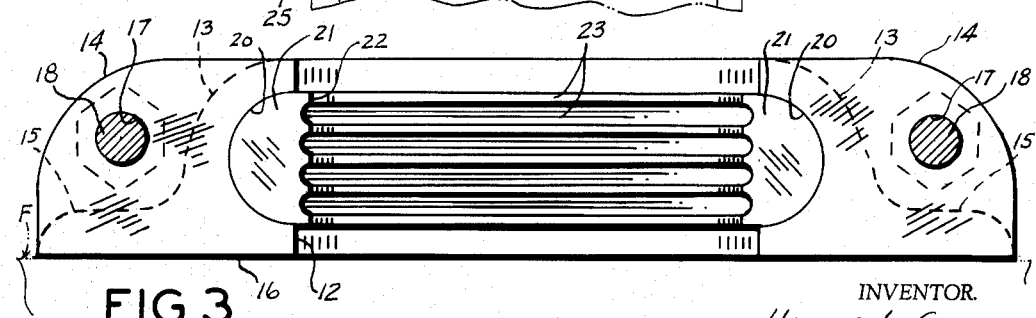
FIGURE 3 is a vertical cross-section taken substantially on the line 3—3 of FIGURE 1.

Each segment 13 has an arcuate groove 20, of semi-circular cross-section, provided in the inner wall 12 thereof. Each groove has snugly complementally received therein an arcuate insert 21, of rubber or like elastic material. The inserts 21, in the cooperative relationship best shown in FIGURE 3, have cylindrical, inwardly presented wall portions 22 approximating the diameter of the conduit C, to conform tightly thereto in the clamped condition of the hanger. For such clamped condition the adjacent ends of the inserts may be slightly spaced, as shown in FIGURE 1. In other words, while the elastic inserts 21 are substantially completely confined within the grooves 20, there is some room for expansion of the rubber at the ends of the inserts and also between the cylindrical wall 12 of the segments and the conduit C, so that when the segments are clamped together the rubber inserts are yieldingly but tightly compressed against the smooth surface of the conduit. Non-slip gripping action between the inserts and the conduit is further enhanced by provision of axially spaced peripherally extending ribs 23, 23 defined by parallel grooves 23a in the cylindrical wall portions 22 of the inserts.

In use of the improved hanger 10 the segments 13 thereof may be detached by release of the clamping bolts 18, and the segments may be applied against opposite sides of the conduit, after which the bolts are applied and operated to clamp the separate segments together about the conduit, as shown in FIGURES 1 and 2, thereby yieldingly to compress the inserts against the conduit. With the conduit C vertically received through an opening 25 in a floor or like structure F, the hanger 10 is engageable downwardly against the floor to support the hanger, which in turn clampingly embraces the conduit to support the same. The hangers also may be applied to the conduit from an end thereof without complete separation of the hanger segments. For this purpose the segments may be sufficiently separated by adjustment of the bolts 17 to permit reception of the hanger over a thick end portion such as a coupling bead of known type (not shown) at the end of the conduit.

In the clamped condition of the hanger 10 shown in FIGURES 1 and 2, the hanger is vertically supported against the floor F, and the inserts are tightly compressed about the conduit to support the same vertically through floor F. For this purpose the elastic material of the inserts 21 may be neoprene approximately of the elastic hardness of tire tread rubber, for example, depending somewhat on the weight of the conduit to be supported.

As only the elastic inserts 21 come in contact with the glass conduit C, there is no chance for edges of the hard segments 13 to scratch the conduit, or otherwise to weaken and cause breakage of the same. Moreover, the elastic inserts absorb vibration in the floor which might otherwise tend to loosen the clamping grip on the glass conduit.

Modifications of the invention may be resorted to without departing from the spirit thereof or the scope of the appended claims.

I claim:

1. A hanger as for non-slip support of a glass conduit vertically received through a floor or like structure, comprising: an annular collar assembly of rigid material having a cylindrical inner wall defining an opening therethrough of larger diameter than the conduit; said collar being in separable segments defining peripherally spaced splits between adjacent ends of the segments; adjustable means between said adjacent ends releasably connecting the segments in assembled condition and adjustable for applying clamping action between the segments radially to contact the collar; said collar segments having rigid extensions providing generally flat undersides of substantial broad lateral area in a plane normal to the axis of the collar assembly for flatwise supporting engagement with the structures; said collar segments having annular recess portions in the cylindrical wall portions thereof; the recess portion of each said collar having received and backed therein an insert of elastic material; said elastic inserts in the collar assembly having cylindrical inner wall portions of smaller diameter than said collar opening for complemental yielding engagement with the conduit;

and said cylindrical wall portions of the inserts having a plurality of peripherally extending grooves therein defining non-slip ribs for yielding non-slip engagement with the conduit when the inserts are yieldingly compressed radially against the conduit by application of said clamping action to the segments radially to contract the collar; said annular collar segments with said inserts therein thereby in separated condition being applicable about a said conduit at a point intermediate the ends of the conduit, and contractible into said yielding non-slip engagement with the conduit by clamping operation of said adjustable means.

2. A hanger as in claim 1, said annular recess portions being of semi-circular cross-sectional shape and said inserts being complementally received therein to be yieldingly conformable to the angularity of the conduit with respect to said plane.

3. A hanger as in claim 2, said splits between the segments of the clamped collar assembly defining at least one space allowing yielding distortion of the segments into said yielding non-slip engagement thereof with the conduit.

4. A hanger as in claim 1, said splits between the segments of the clamped collar assembly defining at least one space allowing yielding distortion of the segments into said yielding non-slip engagement thereof with the conduit.

References Cited by the Examiner

UNITED STATES PATENTS

| 957,000 | 5/10 | Robinson | 126—317 |
| 1,833,776 | 11/31 | Dillon | 285—112 |
| 2,028,182 | 1/36 | Barnickel | 285—112 |
| 2,523,741 | 9/50 | Weschler et al. | 248—56 |

FOREIGN PATENTS 430,543  6/35  Great Britain.

CLAUDE A. LE ROY, *Primary Examiner.*